United States Patent
Hirata et al.

(10) Patent No.: US 8,762,513 B2
(45) Date of Patent: Jun. 24, 2014

(54) NETWORK ADAPTER BASED ZONING ENFORCEMENT

(75) Inventors: Kenneth Hiroshi Hirata, Costa Mesa, CA (US); Robert Harvey Nixon, Costa Mesa, CA (US)

(73) Assignee: Emulex Corporation, Costa Mesa, CA (US)

( * ) Notice: Subject to any disclaimer, the term of this patent is extended or adjusted under 35 U.S.C. 154(b) by 912 days.

(21) Appl. No.: 11/960,643

(22) Filed: Dec. 19, 2007

(65) Prior Publication Data

US 2009/0164630 A1 Jun. 25, 2009

(51) Int. Cl.
*G06F 15/173* (2006.01)

(52) U.S. Cl.
USPC ............................................ 709/224

(58) Field of Classification Search
CPC ............ H04L 63/0209; H04L 63/0236; H04L 63/0263; H04L 63/101
USPC ................................................ 709/336–236
See application file for complete search history.

(56) References Cited

U.S. PATENT DOCUMENTS

| 2005/0260973 A1* | 11/2005 | van de Groenendaal ..... 455/411 |
| 2008/0095152 A1* | 4/2008 | George et al. ................. 370/389 |
| 2009/0003361 A1* | 1/2009 | Bakthavathsalam .......... 370/401 |

* cited by examiner

*Primary Examiner* — Thai Nguyen
(74) *Attorney, Agent, or Firm* — McAndrews, Held & Malloy Ltd.

(57) ABSTRACT

Embodiments of the present invention are directed to enforcing zoning at a network adapter of an end point device. Thus, a network adapter can monitor the communications that are sent and/or received by the adapter and discard communications that are prohibited based on the zoning rules applicable to the adapter. In some embodiments, zoning configuration information can be defined and stored at a central entity and sent to the various network adapters. Alternatively, or in addition, each network adapter can also check outgoing communications to ensure that they include a proper source address. More specifically, outgoing communications may be checked to ensure that their source address is the address (or one of the addresses) that are associated with the network adapter. This can be used to detect and/or prevent malfunctions and/or intentional tampering or hacking.

2 Claims, 6 Drawing Sheets

NETWORK ADAPTER BASED ZONING ENFORCEMENT

FIELD OF THE INVENTION

This invention generally relates to electronic networks and more specifically to enforcing zoning in electronic networks.

BACKGROUND OF THE INVENTION

Network adapters may be devices that are provided as part of a computer or another computing device (a host) and are used to offload some network processing from a CPU of the host. Thus, network adapters can include, for example, host bus adapters (HBAs) that connect to Fibre Channel, SCSI, SAS, Ethernet or other types of networks or network interface cards (NICs) that connect to Ethernet and other types of networks.

Many existing networks, such as Fibre Channel and SAS, feature zoning. Zoning refers to the ability to define zones within a network and limit the ability of devices of the network to communicate with other devices based on the zones. More specifically, multiple zones, each including two or more devices may be defined, and each device is only allowed to communicate with other devices that belong to its zone. Thus, zoning would allow one to treat one larger network as multiple separate smaller networks.

In many occasions, multiple smaller networks may be desirable because of security, ease of use, error protection, malware protection and other similar concerns. However, in some of these occasions, it may be more cost efficient to provide a single larger network. Therefore, zoning may be useful to logically split a larger physical network into several smaller logical ones.

In the present disclosure, devices that are within the network fabric such as routers, switches, hubs and the like, (also referred to as network elements) are to be distinguished from network adapters. Network adapters are devices, such as HBAs and NICs, that are part of a network end point, i.e., a computer or another device that actually uses the network for communications. Network elements, on the other hand, are part of the network infrastructure. They provide communication services to the end points but do not use the network for higher level communications that are unrelated to the task of providing network services. Thus, for example, a router may communicate through the network with other routers in order to update internal routing tables. But since these communications are entirely related to providing network services (i.e., routing packets), the router is still a network element. On the other hand, a web server is an end point, as it uses the network for higher level communications that are not strictly related to the network infrastructure. Thus, an adapter that is part of the web server, such as an HBA or a NIC may be considered to be a network adapter.

Zoning is usually enforced in the network fabric (i.e., by various network elements, such as switches, routers, etc.) As a result, networks that feature zoning often require relatively more complex and higher cost network elements than would be needed if these networks did not feature zoning.

Due to recent improvements in the speed and reliability of Ethernet communications, there have been suggestions and developments to modify more complex networks (such as Fibre Channel, SCSI and SAS networks) so that they utilize the simpler and more ubiquitous Ethernet. Thus, for example, Fibre Channel over Ethernet (FCoE) would allow devices to perform Fibre Channel communications over an Ethernet network.

However, Ethernet networks do not usually support zoning. Thus, standard Ethernet network elements (e.g., switches, etc.) usually do not provide zoning services to an FCoE network. Thus, if an existing Ethernet network includes a large number of FCoE enabled end devices, a large number of FCoE network elements may also need to be used to properly enforce zoning. This may increase the overall cost of the network.

SUMMARY OF THE INVENTION

Embodiments of the present invention are directed to enforcing zoning at a network adapter of an end point device. Thus, a network adapter can monitor the communications that are sent and/or received by the adapter and discard communications that are prohibited based on the zoning rules applicable to the adapter. Therefore, the cost of various network elements that were previously necessary to enforce zoning can be reduced. In some cases, some network elements that were previously necessary to enforce zoning can be completely removed from the network. In some cases, zoning can be provided for networks for which zoning was previously not supported. In some embodiments, zoning configuration information can be defined and stored at a central entity and sent to the various network adapters. Thus, it may be ensured that all adapters within a network operate based on the same zoning configuration.

Alternatively, or in addition, each network adapter can also check outgoing communications to ensure that they include a proper source address. More specifically, outgoing communications may be checked to ensure that their source address is the address (or one of the addresses) that are associated with the network adapter. This can be used to detect and/or prevent malfunctions and/or intentional tampering or hacking.

DETAILED DESCRIPTION OF THE EXEMPLARY EMBODIMENTS

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Although embodiments of the present invention are described herein in terns of certain types of networks and certain types of network adapters, it should be understood that the present invention is not limited to such networks and adapters, but is generally applicable to any electronic networks that feature or may benefit from zoning and that feature addressing of end point devices and their associated network adapters.

Figure 1:
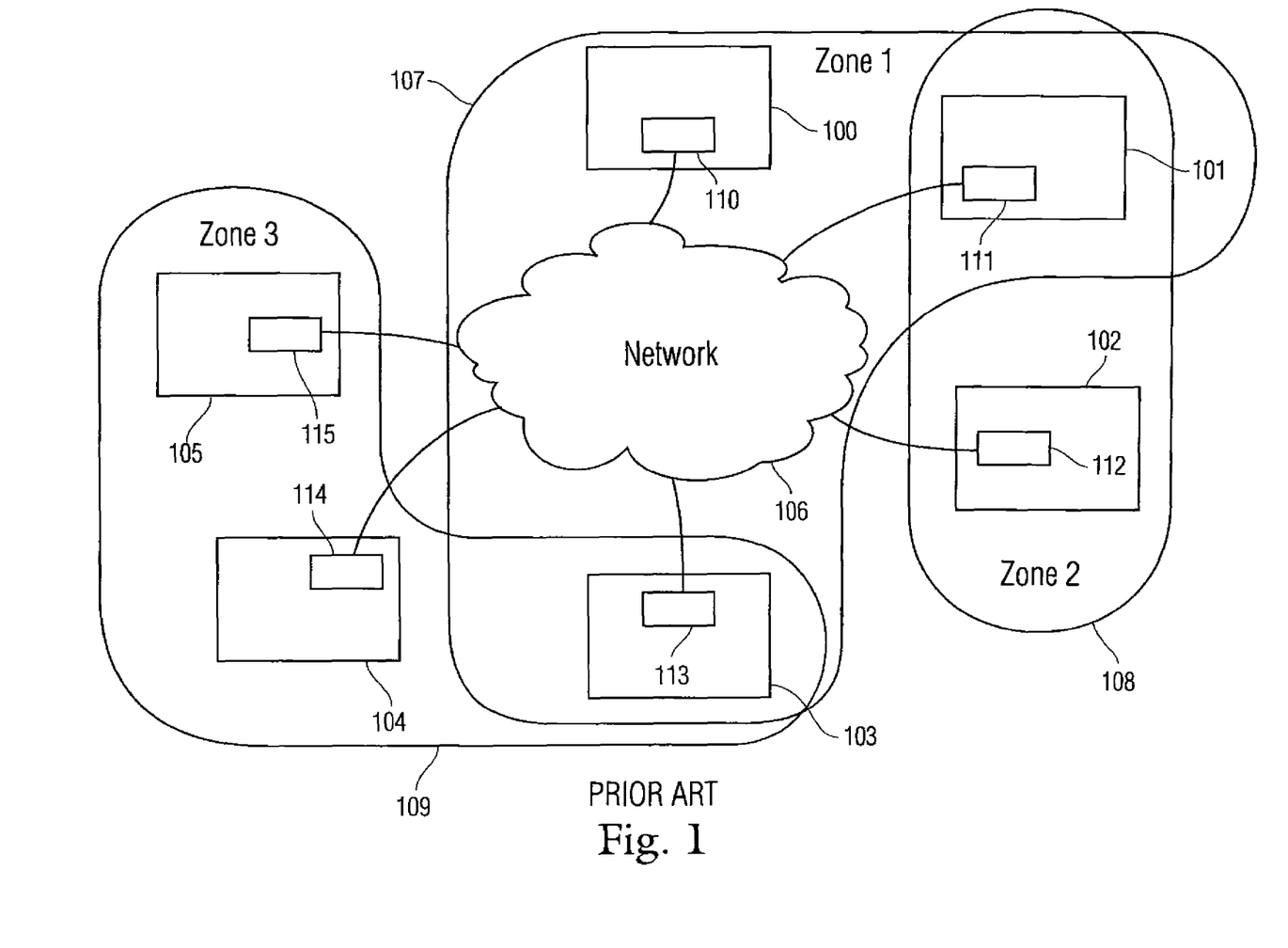
FIG. 1 is a diagram of an exemplary network that features zoning.

FIG. 1 is a diagram of an exemplary network that features zoning. Devices 100-105 include respective network adapters 110-115. The network adapters connect their respective devices to a network 106. The devices are organized in three zones. Devices 100, 101 and 103 are in a first zone 107 (or zone 1). Devices 101 and 102 are in a second zone 108 (or zone 2), and devices 103, 104 and 105 are in a third zone 109 (or zone 3). As can be seen a single device may be a member of multiple zones. Zoning usually provides that any device may only communicate with other devices it shares a zone with. Thus, for example, device 103 may communicate with devices 100 and 101 (through zone 1) and devices 104 and 105 (through zone 3). But device 103 may not communicate with device 102 as it shares no zone with it.

Accordingly, discovery related elements of network 106 may refuse to provide to a first device the address of any other device that does not share any zones with the first device. Thus, the first device may not be even aware that other devices exist in its network. Furthermore, even if the first device somehow generates a message to a device outside of its zones, elements within network 106 that perform zoning may simply prevent the message from being delivered.

According to this scheme, devices 100-105 and their network adapters 110-115 need not even be aware that zoning exists. They may treat all devices that are within their zones as part of their network and need not be aware of the existence of any additional devices in the network.

While the above network provides effective zoning it may require a relatively large number of relatively expensive network elements (such as switches, routers, etc.) that are able to keep track of zones and properly enforce zoning. Furthermore, network 106 cannot be an unmodified Ethernet network, because Ethernet does not enforce zoning. Thus, if network 106 is an Ethernet network it must be modified by adding additional elements or modifying existing ones to support zoning.

Figure 2:
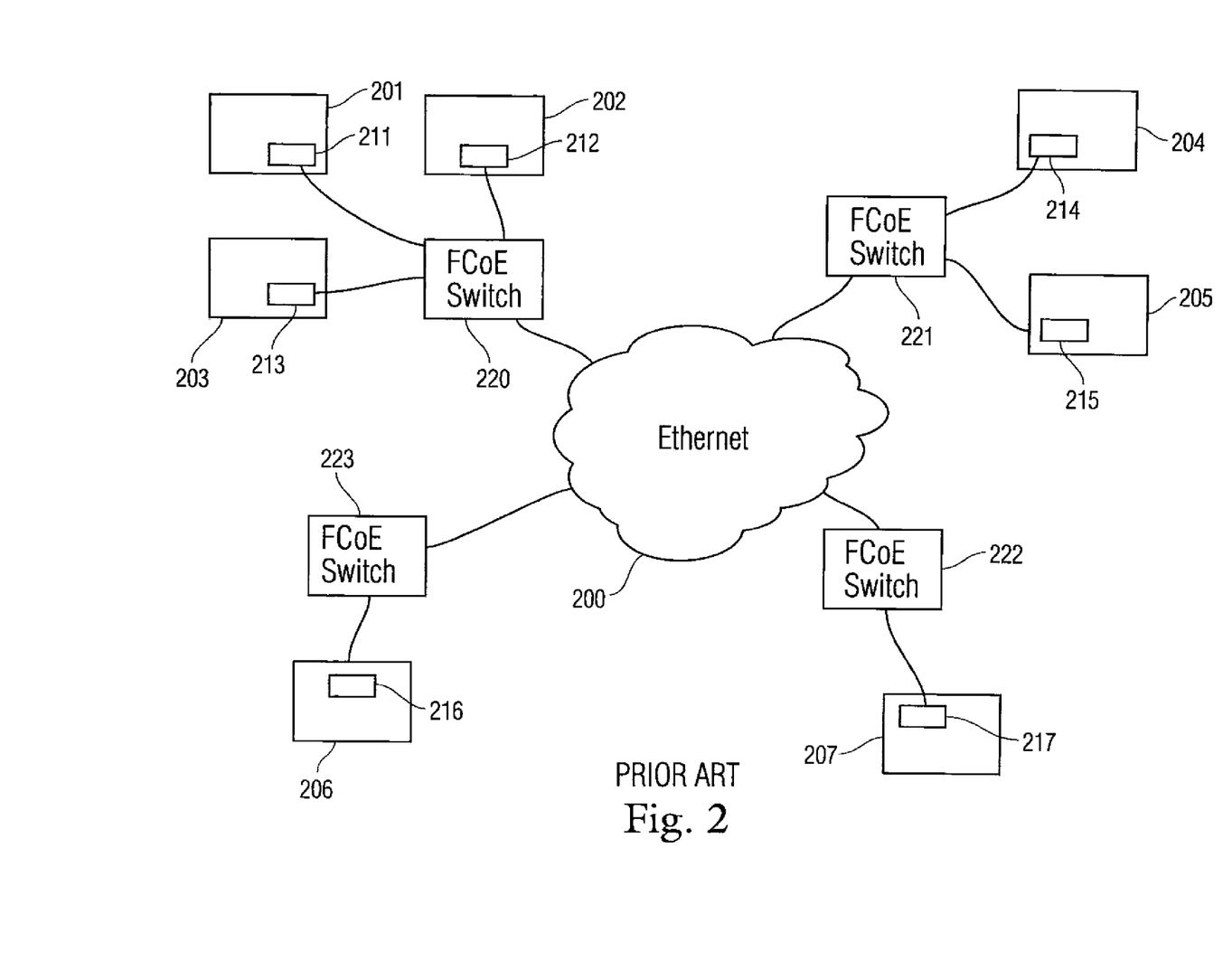
FIG. 2 is a diagram of an exemplary implementation of zoning in an FCoE network.

FIG. 2 is a diagram showing an existing proposal for providing zoning in an FCoE network. Similar proposals are being suggested for implementing other zoning enabled networks over Ethernet.

FIG. 2 shows devices 201 through 207 having respective network adapters 211 through 217. Network adapters 211-217 may be Fibre Channel over Ethernet adapters that are designed for an FCoE network. Devices 201-207 may be separated into several zones (not shown).

FCoE switches 220-223 are also provided. These switches may be the enforcers of zoning. Thus, these switches may ensure that devices do not become aware of other devices outside of their zones through standard discovery protocols and that no devices send any messages to any devices that are outside of their zones. The scheme of FIG. 2 requires that each device that is subject to zoning (e.g., devices 201-207) is connected to an FCoE switch (or some other type of zoning enforcer) before it is connected to the broader Ethernet network 200. Thus, it can be ensured that all communications that originate from a device that is subject to zoning may be checked by an FCoE switch in order to enforce the zoning rules. Furthermore, all communications directed to a device that is subject to zoning can also be checked by the switch connected to that device before they reach the device. Thus, it can be ensured that devices cannot send communications addressed to devices outside of their zones and/or they cannot receive communications from devices outside of their zones.

If the network were configured differently, such as with fewer FCoE switches that are not directly connected to all devices, then it may be possible for a device to send a communication to another device that is outside of its zones, without having this communication be intercepted and stopped by an FCoE switch.

Figure 3:
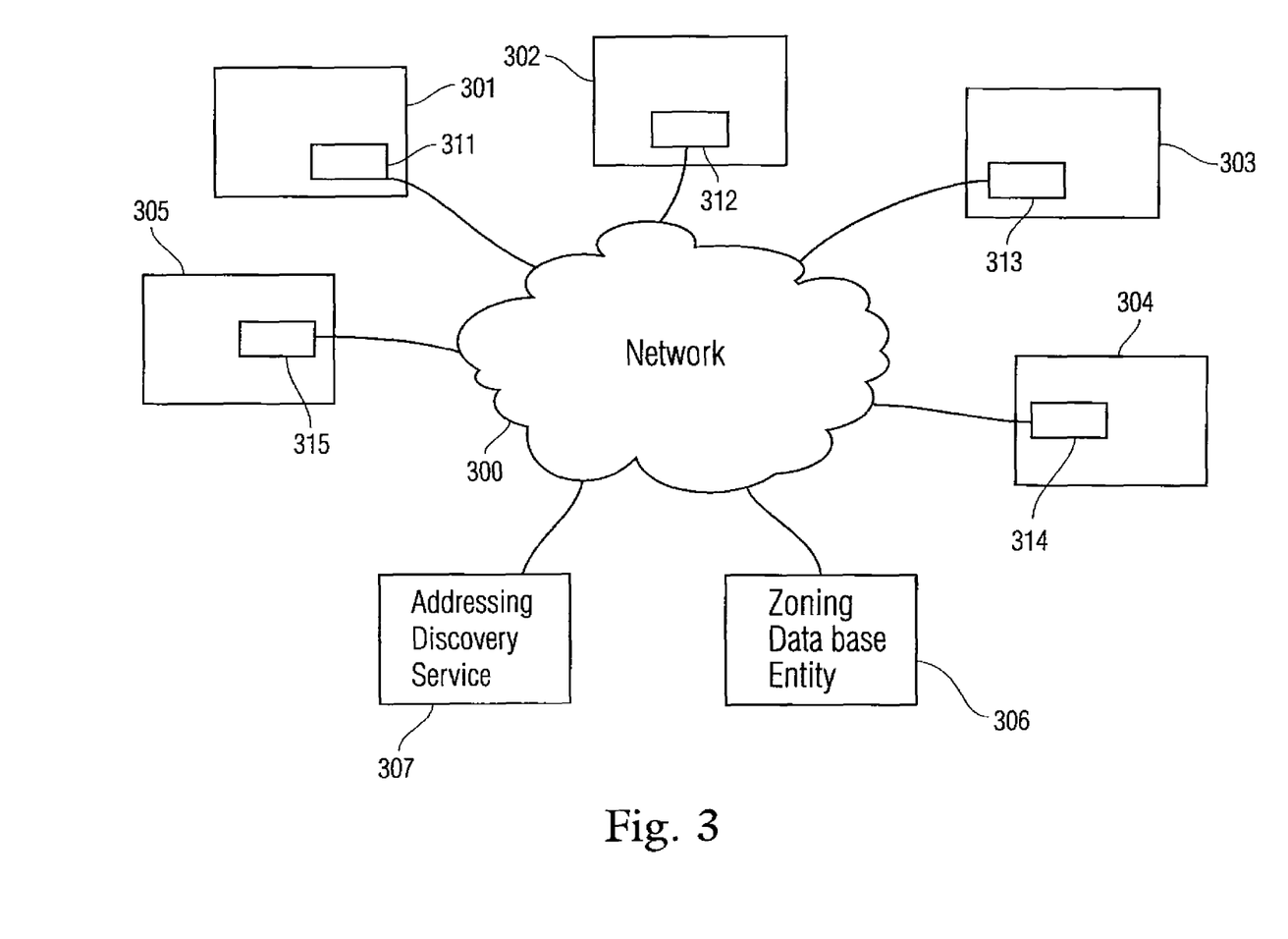
FIG. 3 is a diagram of an exemplary implementation of zoning according to some embodiments of the invention.

FIG. 3 is a diagram of an exemplary implementation of zoning according to embodiments of the present invention. Devices 301 through 305 may include respective network adapters 311 through 315 which connect the devices to network 300. The network adapters can be but are not limited to Fibre Channel HBAs, SAS HBAs, NICs or FCoE adapters. The network can be a Fibre Channel network, a SAS network, a network configured for Fibre Channel over Ethernet or a standard Ethernet network. Other networks may also be used.

Devices 301-305 need not be connected to any network element that enforces zoning before they are connected to the network. In fact, network 300 need not include any elements that check message addressing of messages sent to and from devices 301-305 for the purposes of enforcing zoning. Instead, zoning is enforced by the network adapters 311-315 of the devices instead. Accordingly, the network adapters 311-315 can examine all incoming and outgoing communications and discard communications to/from devices that are not within one or more zones associated with each network adapter (or the device it is a part of).

Zoning database entity 306 may be an entity that keeps zoning configuration information. Thus, zoning database entity 306 may define the existing zones and identify which zone(s) each device belongs to. The zoning database entity may also include an interface allowing an administrator to configure the zones. The zoning database entity may be a server, or another type of device. For example, it may be implemented as a service within one or more network elements (e.g. routers, switches, etc.) While keeping zoning configuration information, the zoning database entity need not have the ability to directly enforce zoning. In most embodiments of the invention, the zoning database entity does not directly enforce zoning.

Address discovery service 307 may be a server or service that is usually used for discovery of addresses and/or devices within the network. For example, in an Ethernet network, the address discovery service may be an iSNS server, In a Fibre Channel network, the address discovery service may be the Name Server of a Fibre Channel fabric. The address discovery service may be modified for the purposes of the present invention in order to provide address discovery consistent with zoning. Thus, the address discovery service may consult the zoning configuration of the zoning database entity 306 and ensure that any requests for address discovery from any of devices 301-305 are responded to by listing only devices that are within the zones of the requesting device.

It should be noted that not all embodiments of the invention require an address discovery service that is modified as discussed above. In some embodiments, the address discovery service may ignore zoning altogether. In such cases, zoning may still be properly enforced by the various network adaptors. Thus, even if a device discovers another device that is outside of its zone, it will not be able to send messages to it, as the network adapter of the sending device will block the message.

The address discovery service may also include various embodiments such as, for example, a server or a service provided by existing network elements. The zoning database entity and the address discovery service may both be provided as part of the same device. For example, if network 300 is an FCoE network, both the zoning database entity and the address discovery service may be provided as part of a single FCoE switch connected to network 300. The FCoE switch need not be directly connected to each of devices 301-305 as was the case in FIG. 2 because the FCoE switch does not need to intercept every communication between the devices. Instead, the FCoE switch may be used to configure the various adapters 311-315 with their respective zoning information and to (optionally) provide zone restricted discovery services for the various devices.

In another embodiment one or both of the zoning database entity 306 and the address discovery service 307 may be provided as a part of one of the devices. One or both of elements 306, 307 may be included in the network adapter of a device (e.g., adapter 314) or the host portion of the device (e.g., software running at a CPU of device 304).

Regardless of how the zoning database entity and the address discovery service are implemented, zoning may be specially configured so that all devices have access to the device(s) that implement the zoning database entity and the address discovery service.

Figure 4:
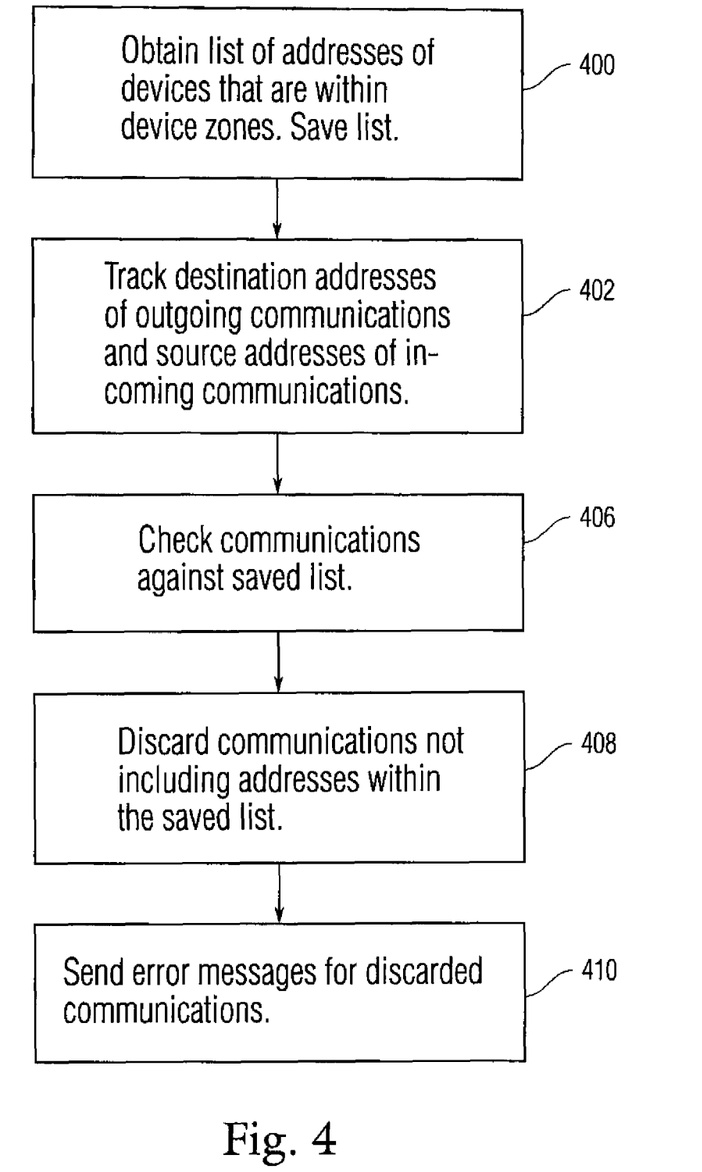
FIG. 4 is a flowchart showing an exemplary method of operating a network adapter according to some embodiments of the invention.

FIG. 4 is a flow chart describing the operation of a network adapter according to one embodiment of the invention. At step 400, the network adapter obtains a list of addresses of the devices that are within the zone(s) the network adapter is a member of. The network adapter can request the list from the zoning database entity, or the list can be pushed by the zoning database entity to the network adapter. The list may be saved in a zoning table or a similar data structure.

At step 402, the network adapter tracks communications it performs. More specifically, it tracks the destination addresses of outgoing communications and the source addresses of incoming communications. In step 406, the tracked addresses are checked against the saved list. In step 408, communications that do not include addresses that are within the saved list may be discarded. More specifically, outgoing communications whose destination addresses are not in the list and incoming communications whose source addresses are not in the list may be discarded.

Step 410 is optional. It provides that error messages for discarded communications may be sent. These messages may include specific "out of zone" messages or may be standard "address not found" messages. Step 410 is usually only performed if the network within which the network adapter operates is of the type that usually provides "address not found" messages. Even in such a case, step 410 is still optional.

In some alternative embodiments, in order to reduce processing requirements, only one type of communication may be tracked (i.e., incoming or outgoing). One may rely on the enforcement actions of the other devices on the network to ensure that out of zone messages of the other type would be blocked. For example, if all network adapters within a network (e.g., adapters 311-315) track their outgoing messages for zoning and discard any out of zone messages, then no device should receive any out of zone messages and inbound message tracking is technically not necessary. However, in this embodiment there is a danger of zoning being compromised by a rogue, hacked, mis-designed, or malfunctioning device which improperly sends or receives out of zone messages.

In some embodiments, the source field of outgoing messages may also be checked. However this field is not checked against the zoning table, but against the network adapter's own address. In some cases, the network adapter may be associated with multiple addresses, and the source field may be checked to determine if it matches any of the addresses associated with the network adapter. Communications that do not include the proper address may be discarded and an error message may be sent to the device the network adapter is a part of or to an administrator.

Thus, it may be determined whether the network adapter is misrepresenting its own address. The network adapter may misrepresent its own address due to a malfunction or an intentional tampering with the adapter's firmware and/or hardware (i.e., hacking). Thus, the above discussed feature may defend against improper tampering and detect malfunctions. This feature may be related to zoning as it may be used to catch various illicit methods of evading the zoning limitations of a network (e.g., sending out communications with improper source addresses). However, this feature is also useful on its own and may, in some embodiments, be performed without performing the various zoning related operations discussed herein.

Figure 5:
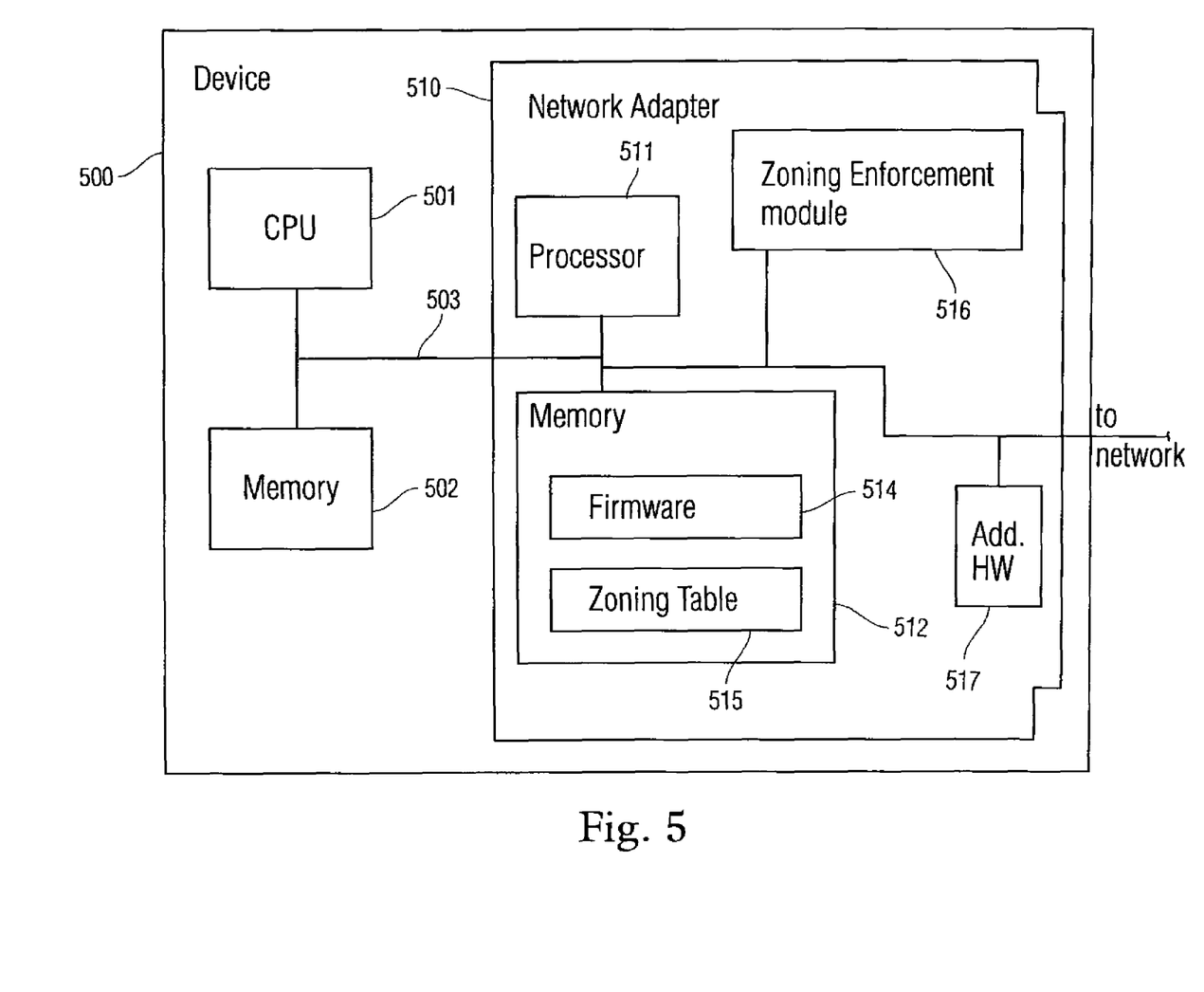
FIG. 5 is a diagram of an exemplary device including an exemplary network adapter according to some embodiments of the invention.

FIG. 5 is a diagram of an exemplary device and its exemplary network adapter. Device 500 may be a computer (such as a workstation, server, etc.) or another similar computing device (such as, e.g., a RAID controller and the like). It may include a CPU 501 and memory 502. The CPU may execute instructions from the memory. These instructions may be part of higher level software (e.g., application software, middleware, etc.) that communicates over the network. The device may also include a bus 503 that connects it to a network adapter 510. The device may also include other elements (such as, for example, hard drives) which are not shown.

As discussed above, the network adapter 510 may be a Fibre Channel or SAS HBA, an NIC, an FCoE adapter, or any other type of network adapter. The network adapter may generally process network communications for the device. It may include an embedded processor 511. The processor may include but is not limited to an ARM processor. The memory may include firmware 514. The firmware may be software executed by the embedded processor. The memory may include a zoning table 515. As discussed above, the zoning table may be used to indicate the addresses of devices that are within the zones device 500 is a member of.

The network adapter may also include a zoning enforcement module 516. The zoning enforcement module may be a module that performs the method of FIG. 4. In some embodiments, the zoning enforcement module may comprise application specific hardware. This may be beneficial as the zoning enforcement module may need to examine every incoming and/or outgoing message and the network adapter may be able to send and/or receive messages at a high speed. For similar reasons, in some embodiments the zoning table may not be provided in the general memory 512 of the network adapter, but may be stored in high speed registers. Alternatively, the zoning enforcement module may be partially or entirely implemented through firmware. Thus, it may be part of firmware 514. The network adapter may include other elements such as additional hardware 517, bus and network interface modules, (not shown), etc.

Various elements of the network adapter that are utilized for basic network communications processing (and not for the zoning enforcement features discussed herein) may combine to form a network processing module of the network adapter. Thus, with reference to FIG. 5, the network processing module may include the processor 511, the memory 512, the firmware 514 and the additional hardware 517. If the zoning enforcement module is implemented in firmware, the network processing module need not include that portion of the firmware that is part of the zoning enforcement module.

In some embodiments, the network processing module may enable the device to operate at more than one address. In some such embodiments, the zoning enforcement module

516 may enforce different zone memberships for each address by which the device communicates. In some such embodiments, all zone memberships may be kept in a single Zoning Table 515 for all addresses at which the device is enabled to operate, or zone memberships may be kept in separate instances of the Zoning Table 515 for each address at which the device is enabled to operate.

A device that is associated with multiple addresses may be considered to implement multiple virtual devices (each virtual device being associated with its own respective address). By enforcing different zone memberships for each address, embodiments of the present invention can ensure that the different virtual devices implemented at a device can be members of different zones (or sets of zones). An effective device may be a device that is associated with a single (i.e., only one) address. Thus, an effective device may be an actual device that is associated with a single address, or a virtual device that is associated with a single address (and which may in turn be implemented by an actual device that is associated with multiple addresses).

In some embodiments, the network adapter may include two pipelines, each pipeline including a separate processor, memory and additional hardware. These embodiments usually provide that the two pipelines process communications in parallel so that the network adapter can, for example, receive data while sending data. In such cases, two zoning enforcement modules may be provided (which may also operate in parallel). Alternatively, a single zoning enforcement module may be present which processes the communications of both pipelines. In another alternative, a single module may only process the communications of a single pipeline (e.g., only incoming or only outgoing communications), relying on the network adapters of other devices to ensure that zoning is enforced in the other pipeline (see above for more detailed discussion of these embodiments).

In some embodiments the zoning enforcement module 516 may also check that the device's own address (or addresses) is properly provided in communications. In other words, it may check the source address of outgoing communications (as discussed above in more detail). In some embodiments, instead of a zoning enforcement module 516, an own address verification module (not shown) may be used. The own address verification module may check that the device's own address (or addresses) is provided in communications without performing any zoning related enforcement.

Figure 6:
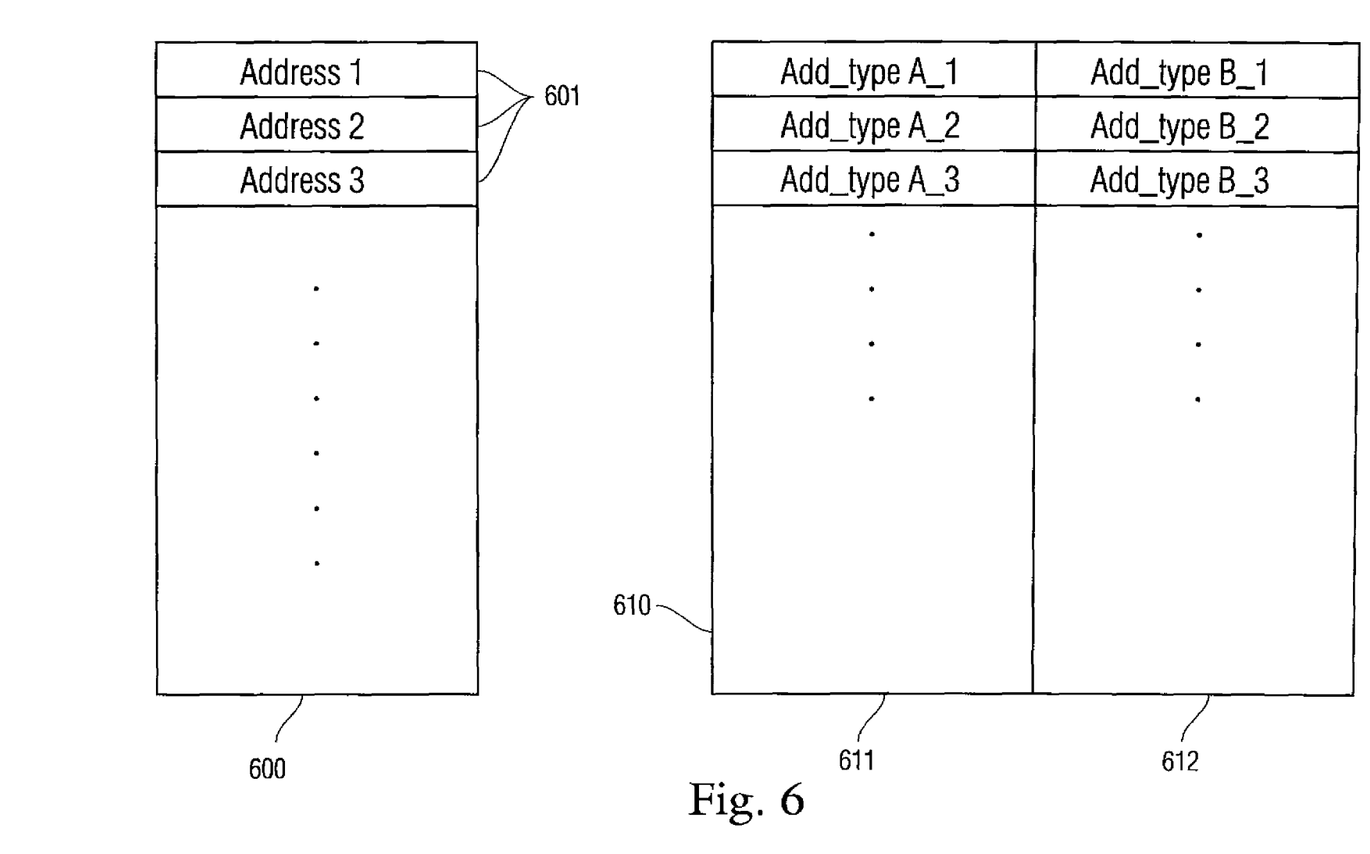
FIG. 6 is a diagram of two exemplary zoning tables according to some embodiments of the invention.

FIG. 6 is a diagram of two exemplary zoning tables according to some embodiments of the invention. Table 600 may simply list one or more addresses 601 of devices that are part of the same zones as the device the table is stored in (the host device). Table 600 need not list which particular zone each listed address is part of. Thus, if the host device is part of two or more zones (see, e.g., device 103 of FIG. 1), there need not be any differentiations between which one or more of these zones each address is associated with. In alternative embodiments where advanced features may require that information, the zone(s) of each address may be stored. The addresses may be configured so that they do not repeat even if an address shares more than one zone with the host device. This may be ensured by the zoning database entity (by sending lists including non-repeating addresses to the various devices). Alternatively, repetitions may be removed by the local network adapter. In other embodiments, repetitions may be allowed. Addresses 601 may be of different types depending on the network the host device is connected to but are usually all of a single type.

Table 610 is a zoning table according to some alternative embodiments. Table 610 may include two columns—611 and 612. Each column may store addresses of a different type. Thus, column 611 stores addresses of type A, while column 612 stores addresses of type B. Addresses of the same row may be associated with the same device. Thus, for example, <Add_typeA_2> and <Add_type_B_2> may be two addresses of two different types that nevertheless refer to the same device. In some cases, two or more address pairs may be associated with the same device (e.g., the different address pairs may be associated with different entities within the same device).

Table 610 may be used as an address translation table for networks where two types of addresses are used. For example, in a Fibre Channel over Ethernet (FCoE) network, both Fibre Channel and Ethernet addresses are used and one type often has to be translated into the other. Thus, in FCoE related embodiments, addresses of column 611 may be Fibre Channel addresses (i.e., N_Port_IDs) and addresses of column 612 may be Ethernet addresses (e.g., Ethernet MAC addresses, or IP addresses). Thus, table 610 may be used for translating the various addresses as well as enforcing zoning. Zoning may be enforced by tracking the type of addresses zones are defined in. For example, in an FCoE network, zones are usually defined in terms of Fibre Channel addresses, so zone enforcement may be performed by tracking a column associated with Fibre Channel addresses.

An advantage of table 610 is that such a table already exists in network adapters for some networks (e.g., FCoE adapters). Therefore, a separate zoning table need not be kept. Instead, the zoning enforcement module may ensure that only addresses within the zones the host devices is part of are kept in table 610. Thus, an already existing address translation table may be also used as a zoning table.

Some of the above discussion assumes that each device includes a single network adapter. Thus, the address and zone memberships of a network adapter and those of a device including the network adapter are used interchangeably. However, a person of skill in the art would recognize that embodiments of the present invention are possible for cases where a device may include multiple network adapters wherein each network adapter has a different address and is a member of a different set of zones. Furthermore, as discussed above, it is possible for a single network adapter at a single device to utilize multiple addresses, and thus appear to the network as multiple network adapters (such as, for example, by using Fibre Channel's N_Port_ID Virtualization or NPIV feature). This may also be part of the present invention, even if the different addresses of the single network adapter are members of different sets of zones. In such a case, the network adapter may keep a different zoning table for each address it is associated with and check incoming and outgoing communications with a respective zoning table based on the address those communications are associated with. More specifically, the proper zoning table may be selected based on the destination address of incoming communications and the source address of outgoing ones.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for enforcing network zoning in a network comprising a plurality of end point devices, each end point device being associated with one or more addresses, at least one end point device being associated with two or more addresses, where each end point device associated with only one address is an effective device, two or more end point devices in the plurality of end point devices with only one address thus defining a plurality of effective devices, and each end point device associated with two or more addresses implementing a plurality of virtual devices, the method comprising:

assigning the plurality of effective devices and the plurality of virtual devices to a plurality of zones, so that each effective device and each virtual device is a member of one or more zones;

composing a plurality of sets of addresses, each set of addresses being associated with a respective effective device or a respective virtual device, each set of addresses including the addresses of all effective devices and virtual devices which are members of at least one zone the respective effective device or the respective virtual device is a member of;

sending each set of addresses to its respective end point device, wherein each end point device stores the set of addresses; and     enforcing network zoning by one or more elements of an attachable network adapter card,     for each effective device, the enforcement of network zoning comprises:

monitoring incoming and outgoing communications of the effective device,         discarding incoming communications of the effective device that do not include an address from the set of addresses as a source address, and         discarding outgoing communications of the effective device do not include an address from the set of addresses as a destination address,     for each virtual device, the enforcement of network zoning comprises:

monitoring incoming and outgoing communications of the virtual device         discarding incoming communications of the virtual device that do not include an address from the set of addresses as a source address, and         discarding outgoing communications of the virtual device that do not include an address from the set of addresses as a destination address.

2. A network comprising:

a plurality of end point devices, each end point device being associated with one or more addresses, at least one end point device being associated with two or more addresses, where each end point device associated with only one address is an effective device, two or more end point devices in the plurality of end point devices with only one address thus defining a plurality of effective devices, and each end point device associated with two or more addresses implements a plurality of virtual devices;

a zoning database entity configured to assign the plurality of effective devices and virtual devices to a plurality of zones, so that each effective device and virtual device is a member of one or more zones, the zoning database entity being operable to compose a plurality of sets of addresses, each set of addresses being associated with a respective effective device or a respective virtual device, each set of addresses including the addresses of effective devices and virtual devices which are members of at least one zone the respective effective device or the respective virtual device is a member of; and     an attachable network adapter card comprising:

a memory operable to store a set of addresses associated with an endpoint device; and         a processor operable to enforce network zoning at the end point device,         wherein if the end point device is an effective device, the enforcement of network zoning comprises:

monitoring outgoing communications of the effective device,             discard incoming communications of the effective device that do not include an address from the set of addresses as a source address, and             discarding outgoing communications of the effective device that do not include an address from the set of addresses as a destination address, and         wherein if the end point device is associated with more than one address, the enforcement of network zoning comprises:

monitoring outgoing communications of the virtual devices,             discarding incoming communications of the virtual devices that do not include an address from the set of addresses as a source address, and             discarding outgoing communications of the virtual devices that do not include an address from the set of addresses as a destination address.

\* \* \* \* \*